US010033069B2

(12) United States Patent
Ramani et al.

(10) Patent No.: US 10,033,069 B2
(45) Date of Patent: Jul. 24, 2018

(54) POROUS ABSORBENT FOR SODIUM METAL HALIDE CELLS

(71) Applicant: General Electric Company, Schenectady, NY (US)

(72) Inventors: Manikandan Ramani, Clifton Park, NY (US); Edward James Balaschak, Avon, OH (US); Robert Christie Galloway, Derbyshire (GB); Raymond R. Cole, Wilton, NY (US); Jonathan Adam Bielik, Albany, NY (US)

(73) Assignee: General Electric Company, Schenectady, NY (US)

( * ) Notice: Subject to any disclaimer, the term of this patent is extended or adjusted under 35 U.S.C. 154(b) by 814 days.

(21) Appl. No.: 13/955,476

(22) Filed: Jul. 31, 2013

(65) Prior Publication Data

US 2015/0037645 A1    Feb. 5, 2015

(51) Int. Cl.
*H01M 4/13* (2010.01)
*H01M 10/39* (2006.01)
(Continued)

(52) U.S. Cl.
CPC ........... *H01M 10/399* (2013.01); *H01M 2/18* (2013.01); *H01M 4/0402* (2013.01); *H01M 4/048* (2013.01); *H01M 4/364* (2013.01); *H01M 4/38* (2013.01); *H01M 4/582* (2013.01); *H01M 10/38* (2013.01); *H01M 4/74* (2013.01);
(Continued)

(58) Field of Classification Search
CPC .... H01M 10/398; H01M 10/39; H01M 4/364; H01M 4/582; H01M 4/048; H01M 4/38; H01M 4/0402; H01M 4/74; H01M 2/18; H01M 2004/028; H01M 2220/10; H01M 2220/20; H01M 2300/0057; H01M 4/0473; Y01T 29/49115
USPC ................ 429/101–103, 112, 623.5; 205/59; 29/623.5
See application file for complete search history.

(56) References Cited

U.S. PATENT DOCUMENTS 4,348,468 A    9/1982 Wright
4,797,333 A *  1/1989 Coetzer ................. H01M 10/39
                                                    205/409
(Continued)

FOREIGN PATENT DOCUMENTS

EP    0161079 B1    4/1990
WO    2011056297 A1    5/2011
WO    2011075298 A1    6/2011

Primary Examiner — Miriam Stagg
Assistant Examiner — Claire L Roe
(74) Attorney, Agent, or Firm — Dority & Manning, P.A.

(57) ABSTRACT

A cell cathode compartment comprises a granule bed comprising metal granules, metal halide granules, and sodium halide granules, a separator adjacent to the granule bed, a liquid electrolyte dispersed in the granule bed, and a porous absorbent disposed in the granule bed, wherein a transverse cross-sectional distribution of the porous absorbent in the granule bed varies in a longitudinal direction from a first position to a second position. In another embodiment, a cell cathode compartment comprises a granule bed comprising metal granules, metal halide granules, and sodium halide granules, a separator adjacent to the granule bed, a liquid electrolyte dispersed in the granule bed, and a porous absorbent coating on a surface adjacent to the granule bed.

16 Claims, 10 Drawing Sheets

(51) Int. Cl.
  *H01M 4/04*   (2006.01)
  *H01M 4/36*   (2006.01)
  *H01M 4/38*   (2006.01)
  *H01M 4/58*   (2010.01)
  *H01M 10/38*  (2006.01)
  *H01M 2/18*   (2006.01)
  *H01M 4/74*   (2006.01)
  *H01M 4/02*   (2006.01)

(52) U.S. Cl.
  CPC .. *H01M 2004/028* (2013.01); *H01M 2220/10* (2013.01); *H01M 2220/20* (2013.01); *H01M 2300/0057* (2013.01); *Y10T 29/49115* (2015.01)

(56) References Cited

U.S. PATENT DOCUMENTS

| | | |
|---|---|---|
| 4,895,777 A | 1/1990 | Kagawa |
| 5,143,802 A * | 9/1992 | Wright ............... H01M 4/64 429/103 |
| 5,536,594 A | 7/1996 | Galloway et al. |
| 8,110,301 B2 | 2/2012 | Iacovangelo et al. |
| 8,343,661 B2 | 1/2013 | Galloway et al. |
| 2003/0054255 A1 | 3/2003 | Hidaka et al. |
| 2010/0068610 A1 * | 3/2010 | Sudworth ............ H01M 4/38 429/102 |
| 2011/0206980 A1 | 8/2011 | Yerramalli et al. |
| 2012/0301768 A1 | 11/2012 | Ramamurthi et al. |
| 2013/0157140 A1 | 6/2013 | Bartling et al. |

* cited by examiner

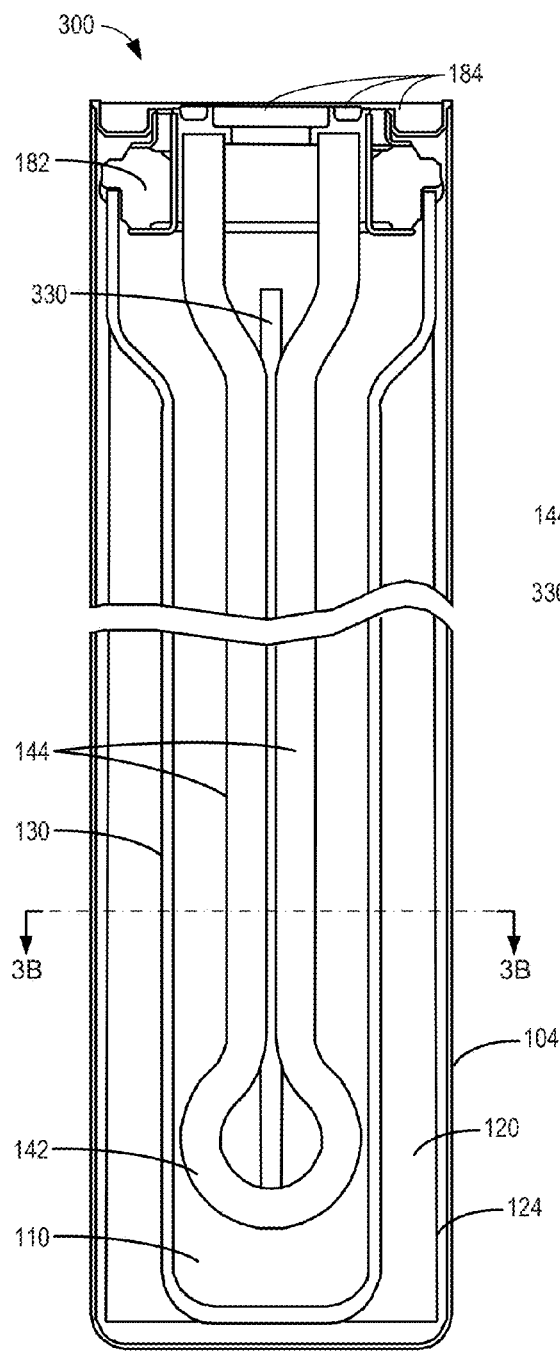
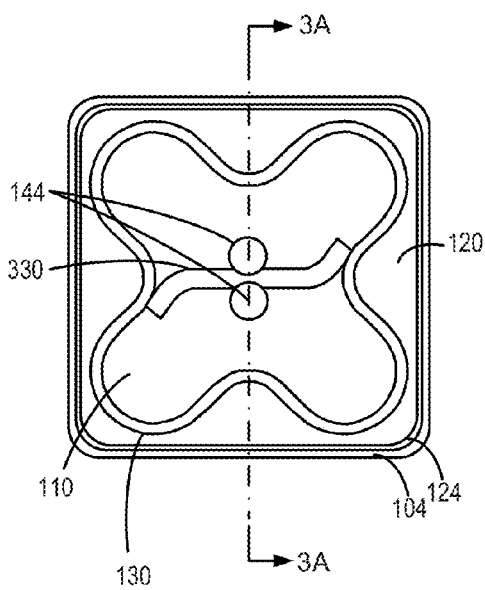

FIG. 4A
FIG. 4B
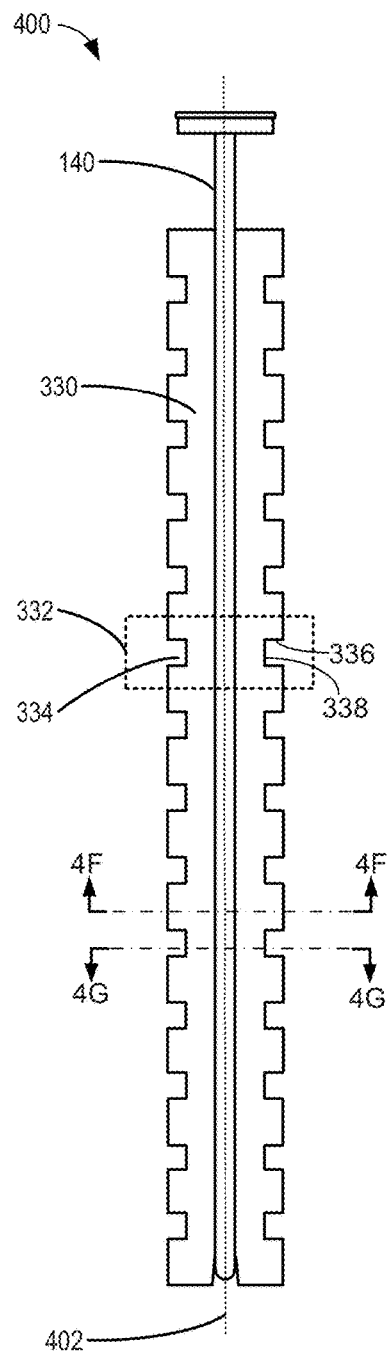
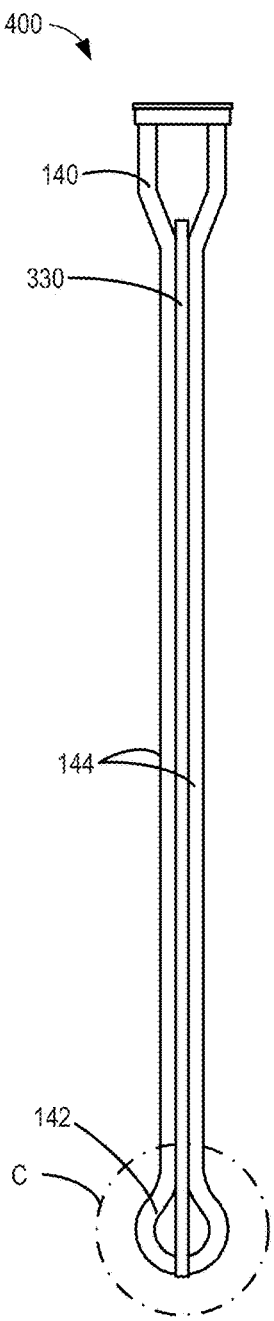

POROUS ABSORBENT FOR SODIUM METAL HALIDE CELLS

FIELD

Embodiments of the subject matter disclosed herein relate to porous absorbent structures in sodium metal halide cells. Other embodiments relate to methods of preparing a sodium metal halide cell compartment.

BACKGROUND

Advanced batteries based on sodium metal halide chemistry ("sodium metal halide cells") have been explored for use in electric vehicles, uninterruptable power systems (UPS), and telecom backup systems because of their high specific energy, power density, long cyclic life, and sustained high-power discharge over frequent cycling as compared to conventional lead-acid cells. One issue with sodium metal halide cells is that the distribution of liquid electrolyte throughout the cell cathode granule bed can become non-uniform after frequent cycling. In particular, following many charge-discharge cycles, the cathode granule cathode bed particle morphology may change and/or degrade, developing heterogeneities such as regions of pore occlusion and channeling, thereby resulting in portions of the granule bed which are inaccessible to liquid electrolyte, and reducing the sodium cell charge capacity. Furthermore, this granule bed degradation can worsen with successive cell cycling, significantly decreasing cell lifetime.

Wright (U.S. Pat. No. 5,143,802) discloses embedding a porous conductive carbon felt slab structure in the granule bed along the length of the cathode compartment in order to maintain more uniform distribution of liquid electrolyte throughout the granule bed.

The inventors have recognized a problem with the above solution. Namely, a carbon felt slab structure is a monolithic structure that divides and isolates portions of the granule bed on either side of the carbon felt slab structure. As such, the carbon felt slab structure reduces cross-communication (e.g., including transport of ions, electrons, and liquid electrolyte) between the isolated portions of the granule bed, thereby reducing charging and discharging efficiency during cell operation. Furthermore, during manufacture of a sodium metal halide cell, the carbon felt slab structure may hinder uniform filling and distribution of the granule bed in the cathode compartment which can generate a load imbalance in the cell and further reduce cell operating efficiency.

BRIEF DESCRIPTION

In one embodiment, a battery cathode compartment, also referred to herein as a cell cathode compartment, comprises a porous absorbent disposed in the granule bed, wherein a transverse cross-sectional distribution of the porous absorbent in the granule bed varies in a longitudinal direction from a first position to a second position. The granule bed may comprise metal granules, metal halide granules, and sodium halide granules, and may further include a liquid electrolyte dispersed in the granule bed. In this manner, distribution of liquid electrolyte throughout the granule bed can be maintained without isolating portions of the granule bed so that cell operating efficiency can be sustained even after many charge-discharge cycles.

In another embodiment, a cell comprises a granule bed in a cathode compartment, the granule bed comprising a porous absorbent disposed in the granule bed, and the porous absorbent having a variable cross-sectional distribution in the granule bed. The granule bed may comprise metal granules, metal halide granules, and sodium halide granules, and the cell may further comprise a liquid electrolyte dispersed in the granule bed, and a separator adjacent to the granule bed.

According to another embodiment, a method of preparing a cell cathode compartment comprises positioning a porous absorbent in the cell cathode compartment, the porous absorbent having a non-uniform cross-sectional distribution in the cell cathode compartment, mechanically mixing cathode granules, and loading the cathode granules into the cell cathode compartment.

In a further embodiment, a cell cathode compartment comprises a porous absorbent coating on a surface of the cell cathode compartment. The cell cathode compartment may further comprise a granule bed comprising metal granules, metal halide granules and sodium halide granules, a separator adjacent to the granule bed, and a current collector disposed in the granule bed.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 3A is a schematic showing a partial longitudinal cross-section of a sodium metal halide cell of FIG. 3B taken at section 3A-3A.

FIG. 3B is a schematic showing a transverse cross-section of the sodium metal halide cell of FIG. 3A taken at section 3B-3B.

FIG. 4A is a schematic showing a side view of a porous absorbent mounted to a current collector.

FIG. 4B is a schematic showing a frontal view of the porous absorbent mounted to the current collector of FIG. 4A.

DETAILED DESCRIPTION

The following description relates to various embodiments of a battery cathode compartment, also referred to herein as a cell cathode compartment, a battery, also referred to herein as a cell, and a method for preparing a cell compartment (e.g. a battery compartment).

In one embodiment, a cell cathode compartment may comprise a granule bed comprising metal granules, metal halide granules, and sodium halide granules. The cell cathode compartment may further include a liquid electrolyte dispersed in the granule bed, and a porous absorbent disposed in the granule bed, wherein a transverse cross-sectional distribution of the porous absorbent in the granule bed varies in a longitudinal direction from a first position to a second position. In this manner, distribution of liquid electrolyte throughout the granule bed can be maintained even after repeated charge-discharge cycles.

Figure 1:
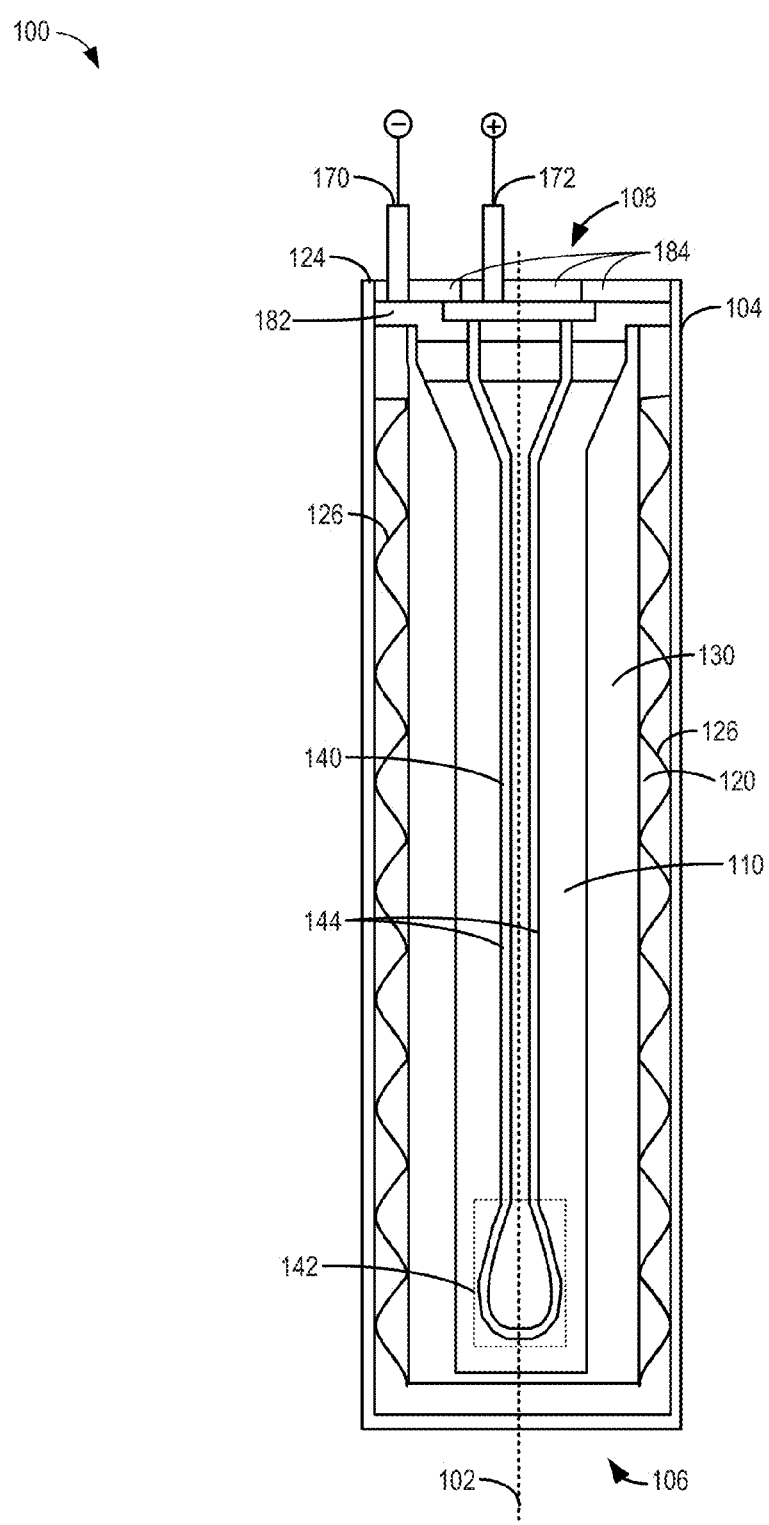
FIG. 1 is a schematic showing a longitudinal cross-section of a sodium metal halide cell.

A longitudinal cross-section of a sodium metal halide cell 100 is shown in FIG. 1. The sodium metal halide cell 100 comprises a cathode compartment 110 and an anode compartment 120 housed within a cell case 104. The cell case 104 of the sodium metal halide cell 100 may be constructed of mild steel or stainless steel, and may comprise a shape of a long hollow cylindrical tube that is closed at a bottom end 106 and hermetically sealed at a top end 108. The sealing of the top end 108 is accomplished via a collared assembly comprising a circular insulating ring 182 of alpha-alumina, wherein the end of the cathode compartment 110 tube contacts and is sealed by the alpha-alumina ring. Furthermore, a series of discs 184 may be, for example, welded to the cell case 104, wherein the anode current collector 124 and the cathode current collector 140 protrude from the discs.

The cathode compartment 110 may form an approximate cylindrical-shaped core of the cell, and a separator 130 and the anode compartment 120 may form concentric annuli around the cathode compartment 110. In this manner, the shape of the cathode compartment 110 are defined by the interior walls of the separator 130, and the shape of the anode compartment 120 are defined by the outer walls of the separator 130 and the inner walls of the anode current collector 124. The shape of the cell case 104 may be approximately cylindrical, square cylindrical, or another hollow shape. Other geometries for the cathode compartment 110 may also be utilized such as a rectangular box shape, and the like, wherein the separator 130 and the anode compartment 120 may form concentric annuli of analogous geometry around the cathode compartment 110. The anode compartment 120 also houses metal shims 126 comprising resiliently stressed bent steel shims, located at suitable positions between the separator 130 and the cell case 104 and in resilient contact therewith. Metal shims 126 thus provide electronic contact between the separator 130 and the cell case 104 in the anode compartment 120. During cell charging, liquid sodium passes through the separator 130 and accumulates in the anode compartment 120 sufficiently to provide electrical contact between the separator 130 and the cell case 104. In some examples, a porous wicking layer of finely divided electronically conductive particles such as iron or nickel particles may be provided as a lining on the surface of the separator 130 in the anode compartment 120 in order to aid in wetting the separator 130 in the anode compartment 120 with sodium and to promote electronic contact with the shims 126.

Although not shown in FIG. 1, the cathode compartment 110 further comprises a granule bed, liquid electrolyte, and a porous absorbent. The granule bed includes metal granules, metal halide granules, and sodium halide granules. For a sodium nickel chloride cell, the metal granules may be nickel granules, the metal halide granules may be nickel chloride granules, and the sodium halide granules may be sodium chloride granules. In other sodium metal halide cells, the metal granules may comprise transition metal granules such as iron, chromium, cobalt, manganese, copper, iron, or mixtures thereof, and the halide may comprise bromide, chloride, fluoride, iodide, astatide, or mixtures thereof.

A cathode current collector 140 may comprise a bent rod forming a tip 142 connected to parallel legs 144, and the tip 142 and legs 144 may extend in a longitudinal direction into the cathode compartment, along a longitudinal axis 102 of the sodium metal halide cell 100 towards the bottom end 106. Towards the top end 108, the cathode current collector legs 144 may protrude from the sealed cathode compartment 110 where they are electrically connected to a positive terminal 172. The cathode current collector may comprise nickel or another conductive metal. The cathode current collector 140 may also comprise a metal wire, mesh, gauze, or other configuration, embedded in the granule bed. The granule bed along with the current collector 140 serve as the positive electrode for the cell.

A separator 130 is disposed between, and separates the anode compartment 120 from the cathode compartment 110, wherein the separator 130 may be concentrically positioned around the cathode compartment 110. The separator 130 may be a solid ceramic separator, and comprises an electronic insulating and ion conducting material such as a beta-alumina solid electrolyte (BASE) separator or nasicon, separating the cathode compartment 110 and the anode compartment 120. For example, the separator 130 may conduct sodium ions, allowing sodium ions to pass from the anode compartment to the cathode compartment and vice versa during charging and discharging of the sodium metal halide cell 100. The granule bed in the cathode compartment 110 may be saturated or flooded with a liquid electrolyte to provide ionic conductivity between the solid granule bed and the separator 130. As such, the liquid electrolyte may wet the cathode compartment 110 side surface of the separator 130. The liquid electrolyte may also provide some electrical conductivity between the granule bed and the cathode current collector 140. As an example, the liquid electrolyte may comprise a molten salt electrolyte for conducting sodium ions. For example, a sodium metal halide cell may utilize sodium aluminum chloride, NaAlCl$_4$, as a molten salt electrolyte for conducting sodium ions. The cathode compartment may further comprise a porous absorbent disposed therein (see FIG. 3 and description below), and the porous absorbent may wick the liquid electrolyte.

During cell charging, a voltage source is connected to the negative terminal 170 and positive terminal 172 of the cell, driving chemical reactions associated with charging the cell. For a sodium nickel chloride cell, the charging reactions are given by the forward (left to right) reactions of equations (1) and (2) in the cathode compartment 110 and the anode compartment 120, respectively:

$$Ni + 2NaCl \leftrightarrow NiCl_2 + 2Na^+ + 2e^- \quad (1)$$

$$2Na^+ + 2e^- \leftrightarrow 2Na \quad (2)$$

According to equation (1), the nickel is oxidised, reacting with sodium chloride to produce nickel chloride, sodium ions and electrons. The electrons may be conducted primarily through the metal granules of the granule bed to the anode compartment 120 via the cathode current collector 140 through the voltage source and to the anode current collector 124. The sodium ions are conducted to the anode compartment 120 through the liquid electrolyte and the separator 130 where they are oxidised, combining with the electrons to produce liquid sodium. When the sodium metal halide cell 100 is fully charged, the anode compartment 120 may be filled with liquid sodium.

During cell discharge the negative terminal 170 and positive terminal 172 of the sodium metal halide cell 100 are connected to a load, spontaneously driving the reverse chemical reactions of the cell charging chemical reactions. In the case of a sodium nickel chloride cell, the discharging reactions are given by the reverse (right to left) reactions of equations (1) and (2) in the cathode compartment 110 and the anode compartment 120, respectively. Accordingly, sodium is oxidised at the separator surface in the anode compartment 120, producing sodium ions and electrons. The sodium ions are transported through the separator 130 to the cathode compartment, and the electrons flow as current through the load, providing power therefor, to the cathode compartment 110. In the cathode compartment 110, the sodium ions react with nickel chloride in the granule bed and electrons are conducted through the load from the anode compartment 120, to produce nickel and sodium chloride. Thus during discharge, the nickel ion is reduced to nickel metal at the cathode, and sodium metal is oxidised to sodium ion at the anode.

The open-circuit voltage of a sodium nickel chloride cell is approximately 2.58 volts, while operating at an internal temperature in a range of approximately 250° to approximately 350° C. and a pressure of 1-2 bar. At these temperatures, the NaAlCl$_4$ electrolyte is molten, and both the liquid NaAlCl$_4$ electrolyte and the solid β-alumina (e.g., the separator 130) conduct sodium ions. Depending on the application a sodium metal halide cell may discharge as low as about 1.7 V per cell. The nominal recharge voltage may be about 2.7 V per cell.

The granule bed may comprise a blend of sufficient metal granules so that less than 50% by mass of the metal granules are used during cell charging, the remaining metal granules serving as an electronically conducting backbone of the cathode when the cell is fully charged. In some examples less than 30% by mass of the metal granules are used during charging to enhance cell capacity and stability. The metal granules, metal halide granules and sodium halide granules may be formed by granulation or compacting metal powder, metal halide powder, and sodium halide powder, or a blend thereof. Additives may also be added during granulation to promote higher granule porosity, and to hinder metal crystal growth. The metal halide powder may comprise finely divided powder, having a particle size of less than 65 microns, for example less than 63 microns. When the metal halide powder is finely divided, the cell may achieve full capacity on the first charge cycle, as compared to when the metal halide powder comprises coarser powder grades where the cell may be run for several charge cycles before reaching full capacity. After loading the granule bed into the cathode compartment, the granule bed is impregnated, saturated, or wetted with the molten salt electrolyte such as NaAlCl$_4$.

By using a granulated bed, homogeneity in the granule bed mixture can be maintained, which aids in increasing reproducibility of cell characteristics (e.g., cell resistance and capacity after several charge cycles) during manufacturing as compared with cells comprising ungranulated powdered mixtures. Granulation of powders also increases the bulk density of the cathode, which improves the cell capacity per unit volume. For example, whereas a blended mixture of metal and sodium halide powders may comprise a bulk density of 0.85 g/cm$^3$, granulating the blended powder mixture may achieve a granulated bed electrode with bulk density greater than 1.9 g/cm$^3$. Granulated beds are also easier to handle as compared to powder blends because less dust is generated. Granulation processes such as cold compaction, flake braking, and sintering may be used to granulate the cathode.

After granulation of the powders, the granule bed may comprise granules ranging from approximately 350 microns to 1000 microns, with a median granule size from 600 to 850 microns. Granules smaller than 350 microns are generally recompacted to larger granule sizes before loading. Approximately 10% of the granules may be larger than 1000 microns.

Figure 2A:
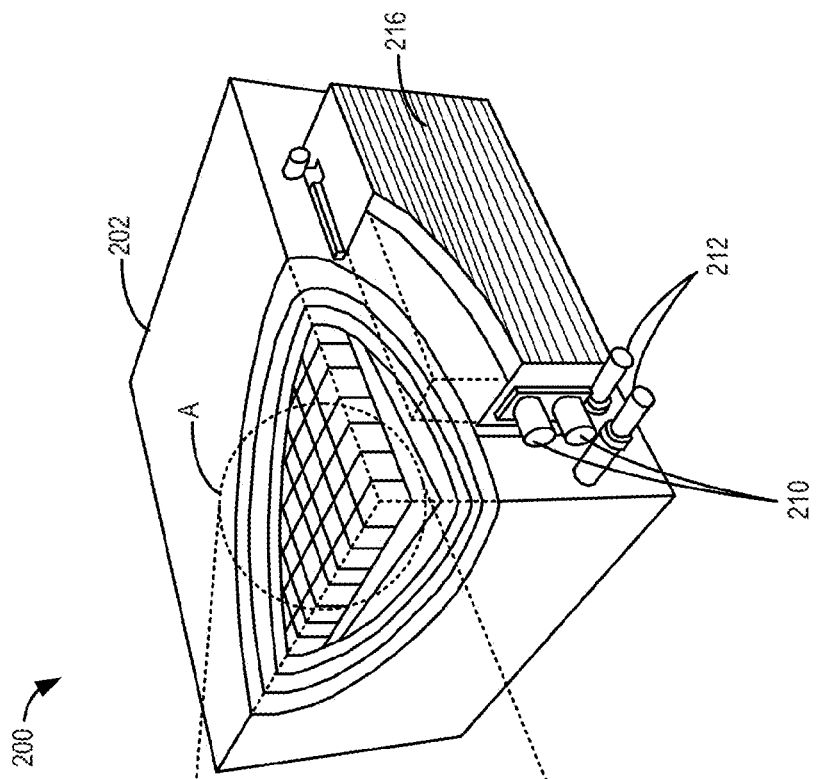
FIG. 2A is a schematic showing a sodium metal halide cell system.
Figure 2B:
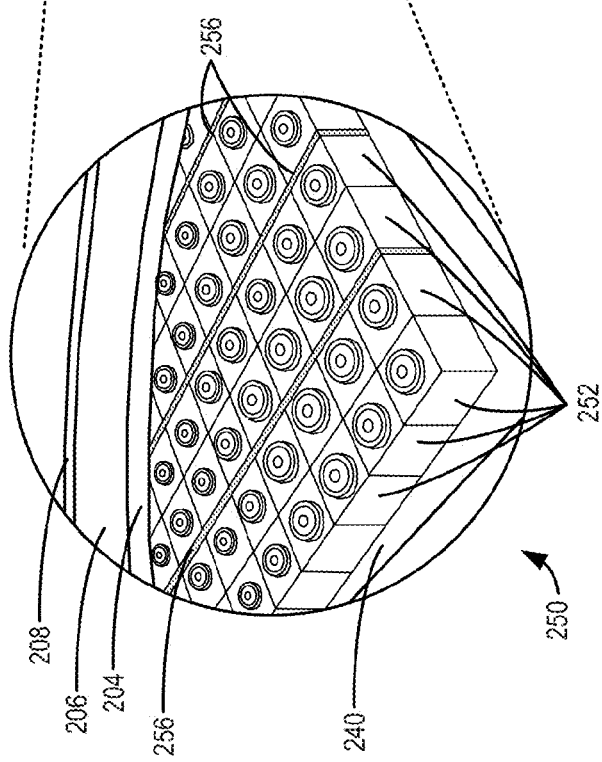
FIG. 2B is a schematic showing an enlarged portion of the sodium metal halide cell system of FIG. 2A.

Turning now to FIGS. 2A and 2B, they illustrate a sodium metal halide cell system 200 and an enlarged perspective view of a portion A of the sodium metal halide cell system 200, respectively. An outer case 202 comprises an outer metal casing 208, fiber insulation 206, and an inner metal case 204 forming a protective and insulative physical shell. The sodium metal halide cell system 200 further comprises inlet and outlet cooling connections 212, electrical terminal connections, and a cell management interface 216. As examples, the cell management interface 216 may comprise an electronic display for displaying operating data, and may also comprise a user interface for entering operator input.

The outer case 202 houses an array 250 of sodium metal halide cells 252 electrically connected in series and/or in parallel for increasing cell voltage and capacity as compared to a single cell. Thermally conductive cooling plates 256 for dissipating heat generated during operation of the sodium metal halide cell system 200 are disposed between sub-arrays of sodium metal halide cells 252. Furthermore, the array 250 may be disposed on a layer of mica insulation 240. Although not shown in FIGS. 2A, 2B, the sodium metal halide cell system 200 may further comprise a controller for controlling operation of the sodium metal halide cell system 200, sensors that may transmit operating conditions to the controller, and wiring and electronics.

FIGS. 3A, 3B, 4A-4E, 6A-6C, 7B-7D, and FIG. 8 include some of the same elements as the sodium metal halide cell shown in FIG. 1. Elements that are the same as elements in FIG. 1 are labeled with the same numeric identifiers. For the sake of brevity, a description of same elements may be omitted; however, the description of elements in FIG. 1 applies to the elements in figures that have the same numerical identifiers.

Turning now to FIG. 3A, it illustrates a partial longitudinal cross-section of a sodium metal halide cell 300. Sodium metal halide cell 300 may comprise an embodiment of a porous absorbent 330 disposed in the granule bed of the cathode compartment 110. The porous absorbent 330 may comprise a knitted and/or non-woven material, such as a felt material, that is highly porous and that wicks the liquid electrolyte. The liquid electrolyte wicking ability of the porous absorbent 330 may be weaker than the liquid electrolyte wicking ability of the granule bed. As such, the porous absorbent 330 may serve as a permeable reservoir of liquid electrolyte. During charging, nickel and sodium chloride react to form nickel chloride which occupies less volume. Sodium ions migrate from the cathode compartment 110 to the anode compartment 120 and for the reaction of equation (1) above, each ampere-hour (Ah) of charge generates approximately 0.45 cm3 of free volume in the cathode compartment 110. Accordingly, liquid electrolyte may flow from the porous absorbent to the granule bed to maintain a more uniform distribution of liquid electrolyte in the granule bed (e.g. fully flooded granule bed) and to maintain saturation of the granule bed with liquid and hence efficient ion transport therethrough. In other words, the excess molten salt in the porous matrix moves into the cathode keeping it fully flooded and maintains ion conductivity. The porous absorbent 330, being distributed along a length of the granule bed, may facilitate distribution of liquid electrolyte across the entire length of the granule bed. During discharge, sodium ions migrate through the separator 130 from the anode compartment 120 to the cathode compartment 110. Liquid electrolyte in the granule bed may be wicked into the porous absorbent 330 to accommodate the inflow of sodium ions and resultant increase in cathode volume.

The charging and discharging reactions may initiate in the cathode compartment 110 at or near the walls of the separator 130, where the cell internal resistance may be lower as compared to other regions in the cell, and continue in a substantially normal direction away from the walls of the separator 130. In this way, a reaction front may move through the granule bed during cell charging and discharging. For example, during cell charging, metal halide may be converted to metal and sodium halide (e.g., equation (1)) at the reaction front, and behind the reaction front (e.g., towards the walls of the separator 130), sodium ions migrate through the liquid electrolyte. Between the reaction front and the cathode current collector 140 near the radial center of the sodium metal halide cell 300, electrons are conducted to the cathode current collector 140 through the granule bed and liquid electrolyte. The electronic conductivity of the metal granules (e.g., nickel granules in a sodium nickel chloride cell) may be higher than the ionic conductivity of the liquid electrolyte so as the distance between the separator 130 and the reaction front increases, the internal resistance of the cathode compartment 110 may increase.

FIG. 3B shows a cross-section of the sodium metal halide cell 300 taken at section 3B-3B. As shown in FIG. 3A and FIG. 3B, the porous absorbent 330 may be mounted between the legs 144 of the cathode current collector 140. Furthermore, alternative to being circular cylindrical shaped, inner walls of the separator 130 may comprise a lobed cruciform cross-section, and thereby define a lobed, cruciform cross-section of the cathode compartment 110. A lobed cross-section for the separator 130 may help in reducing the internal resistance of the cathode compartment 110 during cell charging and discharging as compared to a circular cross-section by increasing the surface area of the separator 130 in contact with the granule bed and by reducing the distance between the separator 130 and the reaction front.

As shown in FIG. 3B, the porous absorbent 330 may span a diametrical length of the cathode compartment 110, and lengthwise edges of the porous absorbent 330 may contact the inner walls of the separator 130. In this way, the porous absorbent 330 may aid in radially distributing liquid electrolyte as the reaction front moves through the granule bed of the cathode compartment 110.

The porous absorbent 330 comprises a volume of 20% or less the volume of the granule bed. In one example, the porous absorbent may comprise a volume of 13% of less the volume of the granule bed. When the volume of the porous absorbent is greater than 15% of the volume of the granule bed, a cell capacity is reduced. As the volume of the porous absorbent 330 in the cathode compartment 110 increases, the volume of the granule bed may decrease, and cell capacity may be reduced. As the volume of the porous absorbent 330 decreases, the liquid electrolyte wicking and storage capacity is reduced, which may decrease cell efficiency at higher charge or higher discharge cell states.

A porosity of the porous absorbent 330 is greater than 90% and less than or equal to 95%, in order to achieve a high surface area to volume ratio. Porosity may be determined by equation (1):

$$\% \text{ Porosity} = \left(1 - \frac{\text{bulk density}}{\text{actual density}} \times 100\right) \quad (1)$$

If the porosity of the porous absorbent 330 is less than 90% a liquid electrolyte saturation volume of the porous absorbent may be reduced, and liquid electrolyte wicking rates may be reduced, which may decrease cell charging and cell discharging efficiencies. Furthermore, an ability of the porous absorbent to maintain a more uniform distribution of liquid electrolyte in the granule bed of the cathode compartment 110 may be decreased, in particular at higher charge or higher discharge cell states. If the porosity of the porous absorbent 330 is higher than 95%, granules from the granule bed of the cathode compartment 110 may enter and occlude the pores of the porous absorbent 330, and liquid electrolyte wicking ability of the porous absorbent 330 may be reduced, which may decrease cell charging and cell discharging efficiencies. The volume and porosity of the porous absorbent 330 may be selected so as to have a liquid electrolyte capacity to compensate for the volume reduction of the granule bed in the cathode compartment as sodium ions migrate to the anode compartment 120 during charging.

The porous absorbent 330 may comprise a carbon-based material such as carbon black (e.g., lamp black), and may also comprise a carbon and/or nickel foam. The porous absorbent 330 may be electrically conductive, but may also be electrically non-conductive. A conductive porous absorbent may aid in electron conduction between the granule bed and the cathode current collector 140. A non-conductive porous absorbent may provide an advantage of reducing current localization during welding of the top end 108 when sealing the sodium metal halide cell 300. For example, when tungsten inert gas (TIG) welding is performed, current may be localized between anode and cathode where the conductive porous absorbent is placed and may cause surface defects such as island cracks in the wall of the separator 130. A non-conductive porous absorbent may aid in reducing degradation of the cell caused by welding. Examples of non-conductive porous absorbents include glass fibers, aluminosilicates, and the like.

Figure 4C:
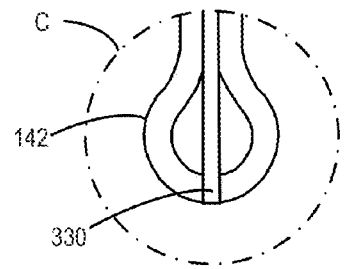
FIG. 4C is a schematic showing an enlarged view of the tip of the porous absorbent mounted to the current collector of FIG. 4A.

Turning now to FIGS. 4A-4E, they illustrate an exemplary structure 400 of the porous absorbent 330 mounted between legs 144 of the cathode current collector 140. As shown in FIG. 4A, the porous absorbent may comprise a porous absorbent slab including one or repeated patterned units 332. The patterned unit 332 comprises one or more cutouts 334, wherein the cutout 334 is transversely recessed towards a longitudinal axis 402 of the porous absorbent 330. Cutout may include any slit, opening, notch, recess or other feature regardless of formation by a cutting operation or otherwise. The cutouts may provide a non-linear edge surface. In this way, the repeated patterned units 332 form dentate lengthwise edges of the porous absorbent 330. The porous absorbent 330 may be symmetrically shaped about the longitudinal axis 402 so that the wicking and flow of liquid electrolyte to and from the porous absorbent is balanced along a length of the granule bed. The repeated patterned units are connected in a lengthwise fashion to substantially span a length of the cathode current collector 140 and the cathode compartment 110. In this way, a length of the porous absorbent may span a length of the granule bed, so that the distribution of liquid electrolyte can be maintained across the entire length of the granule bed during cell charging and discharging.

As previously discussed, lengthwise edges of the porous absorbent 330, in particular, lengthwise edges of the patterned units may contact the walls of the separator 130 when the porous absorbent 330 is mounted to the cathode current collector 140. In this way, the porous absorbent 330 spans a diametric length of the cathode granule bed and the distribution of liquid electrolyte can be maintained across the entire diametric length of the granule bed during cell charging and discharging. At lengthwise positions of the porous absorbent 330 where cutouts 334 of the patterned units 332 are located, the porous absorbent 330 may not contact the separator 130. As such, the cutouts 334 may allow for increased cross-communication between portions of the granule bed on either side of the porous absorbent, including transport of ions, electrons, and liquid electrolyte, thereby increasing charging and discharging efficiency during cell operation as compared to cells employing monolithic felt slabs. The cutouts 334 may also aid with more uniform filling and distribution of the granule bed in the cathode compartment 110, which can reduce load imbalances in the cell and aid in increasing cell operating efficiency. A depth 336 and a length 338 of the cutout may be increased to increase cross-communication. Conversely, the depth 336 and the length 338 of the cutout may be decreased to decrease cross-communication. The depth 336 and length 338 of the cutout may also be selected to increase or decrease a total volume of the porous absorbent 330 in the granule bed.

As shown in FIG. 4B, the porous absorbent 330 may be mounted between the legs 144 of the cathode current collector 140. Furthermore, as shown in FIG. 4C, a bottom edge of the porous absorbent 330 may be flush with a bottom edge of the tip 142 of the cathode current collector 140. In this way, a length of the porous absorbent 330 may substantially span a length of the granule bed.

Figure 4D:
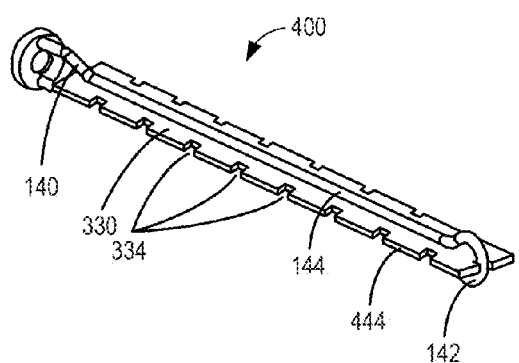
FIG. 4D is a schematic showing a perspective view of the porous absorbent mounted to the current collector of FIG. 4A.

Turning to FIG. 4D, it illustrates a perspective view of the exemplary structure 400 of the porous absorbent 330 mounted between the legs 144 of the cathode current collector 140. As previously discussed, the porous absorbent 330 may comprise repeated patterned units 332 each comprising at least one cutout 334. A bottom edge of the porous absorbent 330 may further comprise a notch 442 to accommodate the tip 142 of the cathode current collector 140. A thickness 444 of the porous absorbent 330 may be from 2 to 6 mm, and may be constant or variable along the length of the porous absorbent 330. If the thickness of the porous absorbent is less than 2 mm, the wicking capacity of the porous absorbent 330 and the cell charging and discharging efficiency may be reduced. When the porous absorbent 330 is thicker than 6 mm, a volume of the porous absorbent 330 may be increased, thereby decreasing a volume of the granule bed such that the cell capacity is decreased.

Figure 4E:
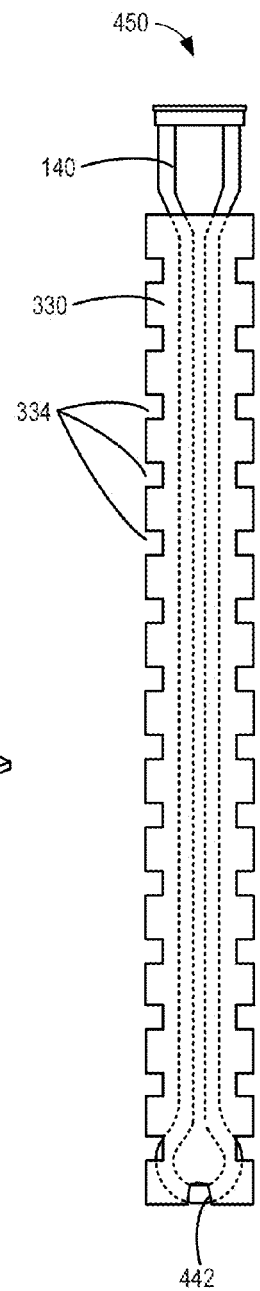
FIG. 4E is a schematic showing a frontal view of a porous absorbent mounted to a current collector.
Figure 4H:
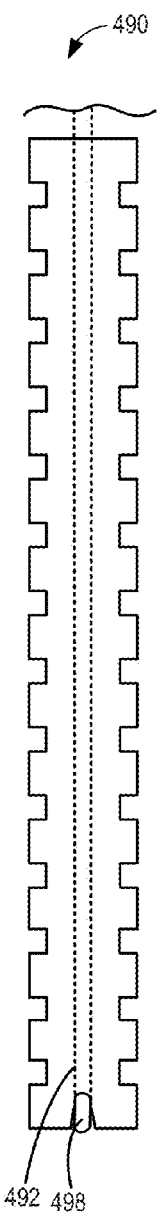
FIG. 4H is a schematic showing a partial frontal view of a porous absorbent mounted to a current collector.

As shown in FIG. 4E, in a further embodiment 450, the porous absorbent 330 may be mounted to a front side of the cathode current collector 140, symmetrically about a longitudinal axis 402 of the granule bed. Alternately, the porous absorbent 330 may be mounted to a rear side of the cathode current collector 140. In some embodiments, mounting the porous absorbent 330 to a side of the cathode current collector 140 may allow the cathode current collector to be configured as a linear strip 492, as shown in another embodiment 490 of FIG. 4H. The configuration may be easier and less costly to manufacture as compared to the bent rod configuration shown in FIG. 4B. As an example, in some embodiments, these strips may be welded into position into braze holes in the fill ring or other attachment structures. Furthermore, the linear strip 492 configuration of the cathode current collector 140 may include a hook 498 at its bottom end to further secure the porous absorbent 330 mounted thereto.

The transverse cross-sectional distribution of the porous absorbent 330 in the granule bed may comprise any suitable configuration wherein the transverse cross-section varies in a longitudinal direction from a first position to a second position. In other words, the porous absorbent 330 has a non-uniform cross-sectional distribution in the cell cathode compartment and/or a variable cross-sectional distribution in the granule bed. As examples, the porous absorbent 330 may comprise a dentate slab, or a porous absorbent slab with transverse cutouts, projections, protrusions, portions with non-uniform thickness, indentations, bumps, nodules, depressions, ridges, grooves, ruts, holes, and the like. As further examples, the porous absorbent 330 may comprise porous absorbent particles dispersed in the granule bed, and having a non-uniform distribution of particle sizes, shapes, porosities, surface areas, surface textures, aspect ratios, and characteristic dimensions. As further examples, the porous absorbent 330 may comprise porous absorbent coated granules, the porous absorbent coated granules having a non-uniform distribution of coating thicknesses, granule sizes, shapes, porosities, surface areas, surface textures, aspect ratios, and characteristic dimensions. Furthermore, the porous absorbent coated granules may be partially or fully coated. Additional specific examples of the porous absorbent 330 having a transverse-cross section varying in the longitudinal direction from a first position to a second position are described herein.

Figure 4F:
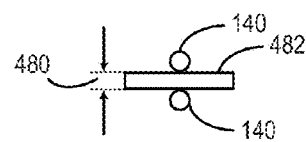
FIG. 4F is a schematic showing cross-sectional views of the porous absorbent mounted to the current collector of FIG. 4A taken at section 4F-4F.
Figure 4G:
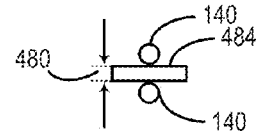
FIG. 4G is a schematic showing cross-sectional views of the porous absorbent mounted to the current collector of FIG. 4A taken at section 4G-4G.

Turning now to FIGS. 4F and 4G, they illustrate transverse cross-sections of the exemplary structure 400 of the porous absorbent 330 mounted to the cathode current collector 140 taken at sections 4F-4F and 4G-4G of FIG. 4A. Section 4G-4G corresponds to a cross-section of the porous absorbent 330 at lengthwise position of a cutout 334, whereas section 4F-4F corresponds to a cross-section of the porous absorbent 330 taken at a lengthwise position where there is no cutout 334. As shown in FIGS. 4F and 4G, although a thickness 480 of the porous absorbent 330 may be the same at cross-sections 484 and 482, the cross-section 484 of the porous absorbent 330 at the cutout 334 is smaller than the cross-section 482 of the porous absorbent 330 where there is no cutout 334.

Figure 5E:
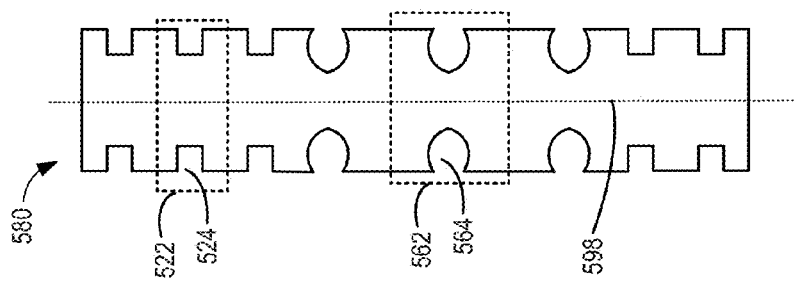
FIGS. 5A, 5B, 5C, 5D, and 5E are schematics showing frontal views of various porous absorbents.
Figure 5D:
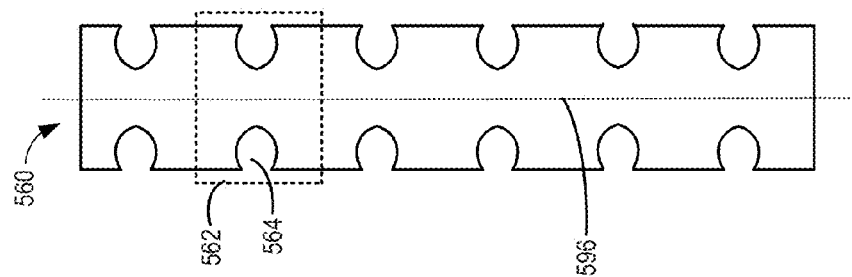
Figure 5C:
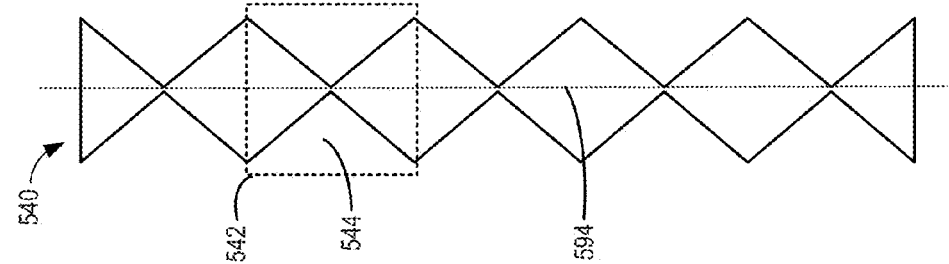
Figure 5B:
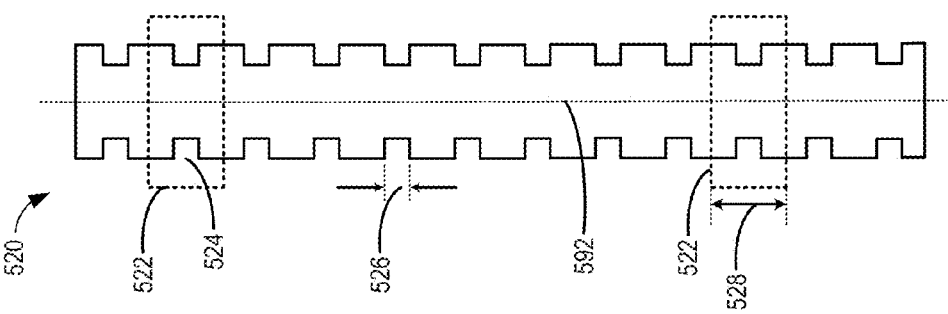
Figure 5A:
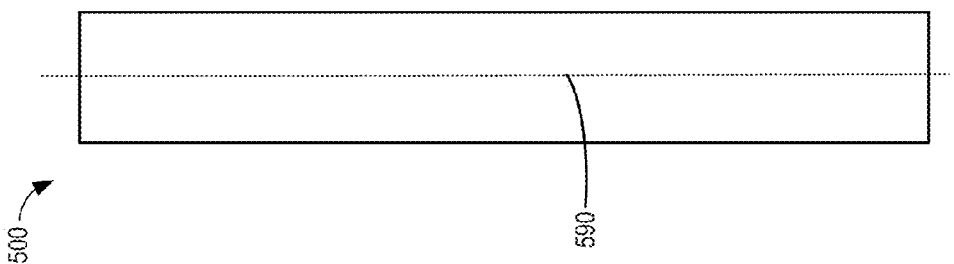

Turning now to FIG. 5A, it illustrates a monolithic porous absorbent 500 comprising a monolithic slab. Monolithic porous absorbent 500 does not comprise cutouts 334, and therefore divides and isolates portions of the granule bed on either side of the monolithic porous absorbent 500. As such, the monolithic porous absorbent 500 reduces cross-communication (e.g., including transport of ions, electrons, and liquid electrolyte) between the isolated portions of the granule bed, thereby reducing charging and discharging efficiency during cell operation. Furthermore, during manufacture of a sodium metal halide cell, the carbon felt slab structure may hinder uniform filling and distribution of the granule bed in the cathode compartment which can generate a load imbalance in the cell and further reduce cell operating efficiency.

Turning now to FIGS. 5B-5E, they illustrate various embodiments of a porous absorbent comprising a slab having a patterned unit, wherein the patterned unit has one or more cutouts transversely recessed towards a longitudinal axis of the slab. In one embodiment, a porous absorbent slab 520 may comprise a plurality of repeating patterned units 522 comprising rectangular cutouts 524 transversely recessed towards a longitudinal axis 592 of the porous absorbent slab 520. In one example, at least one patterned unit 522 comprises a plurality of repeating patterned units. Furthermore, a cutout length 526 may comprise 30% or less of a patterned unit length 528. When the cutout length 526 comprises 30% or less of a patterned unit length 528, the porous absorbent slab 520 may contact the walls of the separator 130 to maintain a more uniform (e.g., saturated and flooded granule bed) distribution of liquid electrolyte over a lengthwise and radial span of the granule bed during cell charging and discharging.

The cutout length 526 may comprise greater than 30% of the patterned unit length 528, depending on the shape of the cutout, the geometry and dimensions of the patterned unit 522, the thickness of the porous absorbent slab, and the like. For example, if the thickness of porous absorbent slab is larger, or the depth of the cutout is smaller, or the patterned unit length is larger, or a suitable combination thereof, the cutout length 526 may comprise greater than 30% of the patterned unit length 528 to maintain a more uniform (e.g., saturated and flooded granule bed) distribution of liquid electrolyte over a lengthwise and radial span of the granule bed during cell charging and discharging.

In another embodiment, a porous absorbent slab 540 may comprise a plurality of repeating patterned units 542 comprising triangular cutouts 544 transversely recessed towards a longitudinal axis 594 of the porous absorbent slab 540. In another embodiment, a porous absorbent slab 560 may comprise a plurality of repeating patterned units 562 comprising cup-shaped cutouts 544 transversely recessed towards a longitudinal axis 596 of the porous absorbent slab 540. In another embodiment, a porous absorbent slab 580 may comprise a plurality of repeating patterned units 522 comprising rectangular cutouts 524 transversely recessed towards a longitudinal axis 598 of the porous absorbent slab 580 and a plurality of repeating patterned units 562 comprising cup-shaped cutouts 564 transversely recessed towards a longitudinal axis 598 of the porous absorbent slab 580. Thus, as shown in FIG. 5E, the porous absorbent slab 580 may comprise more than one type of patterned unit (e.g., 522 and 562).

In the embodiments of FIGS. 5B-5E, the cutouts are symmetrical with respect to the longitudinal axis of the porous absorbent. In other embodiments, the cutouts of the porous absorbent 330 may be non-symmetrical with respect to the longitudinal axis of the porous absorbent 330. In this way, the cutout number, cutout longitudinal position, and cutout dimensions (e.g., transverse depth, length, shape, and the like of the cutouts) may be selected to tune the wicking capacity of the porous absorbent 330 as a function of lengthwise and radial position of the porous absorbent 330 in the granule bed. Furthermore, a thickness 444 of the porous absorbent 330 may be varied along a lengthwise or radial direction to tune the wicking capacity of the porous absorbent 330 as a function of lengthwise and radial position of the porous absorbent 330 in the granule bed.

Further still, in the embodiments of FIGS. 5B-5E, the porous absorbent may have a volume of from 4% to 9% of a volume of the granule bed. The volume of the porous absorbent may depend on the size, shape, number, and the like, of the cutouts and may further depend on the types and numbers of patterned units. In comprising one or repeated patterned units, wherein the patterned unit has one or more cutouts transversely recessed towards a longitudinal axis of the porous absorbent slab, cross-communication (e.g., including transport of ions, electrons, and liquid electrolyte) between portions of the granule bed on either side of the porous absorbent slab can be increased, thereby reducing charging and discharging efficiency during cell operation. As such, the volume of the porous absorbent slab comprising one or repeated patterned units, wherein the patterned unit has one or more cutouts transversely recessed towards a longitudinal axis of the porous absorbent slab may be smaller than the volume of a monolithic carbon felt slab structure, which can allow for an increased granule bed volume and increased cell capacity.

Figure 6A:
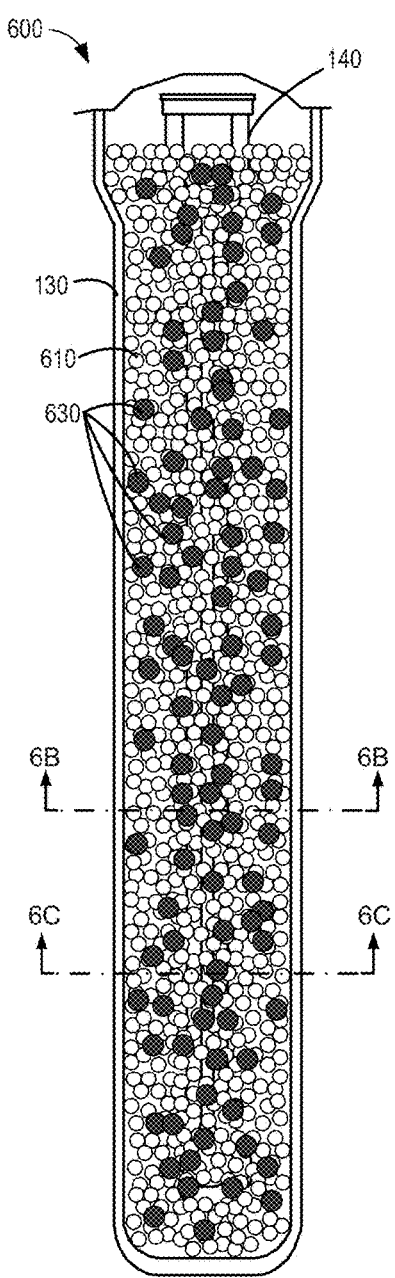
FIG. 6A is a schematic showing a partial longitudinal cross-sectional view of the granule bed in FIGS. 6B and 6C taken at section 6A-6A.

Turning now to FIG. 6A, it illustrates an embodiment of a cathode compartment 600 comprising a granule bed 610, and a porous absorbent comprising porous absorbent particles 630 dispersed throughout the granule bed 610. Dispersed porous absorbent particles 630 in the granule bed 610 may achieve advantages including increased distribution uniformity of liquid electrolyte in the cathode compartment 600 since the porous absorbent particles 630 may be dispersed throughout the granule bed. For example, the porous absorbent particles 630 may be dispersed near the walls of the separator 130. Furthermore, the porous absorbent particles 630 are small in dimension relative to the dimensions of the cathode compartment 600. The shape of the porous absorbent particles 630 may be approximately spherical, and may have a diameter from 0.01 mm to 0.3 mm. A surface area per volume of the porous absorbent particles 630 may depend on a size distribution of the porous absorbent particles. As an example, a size distribution with on average smaller porous absorbent particles may have a higher surface area per volume than a size distribution with on average larger porous absorbent particles. In this way, the size distribution of the porous absorbent particles may be tailored to provide a predetermined rate of wicking and de-wicking of liquid electrolyte from the porous absorbent particles 630 during discharging and charging of the cell, respectively, while maintain a total volume of the porous absorbent particles 630 constant.

Furthermore, a total volume of the porous absorbent particles may be increased or decreased to increase or decrease a wicking capacity of the porous absorbent particles 630. A total volume of the porous absorbent particles 630 may range from 7% to 13% of the volume of the granule bed 610. When the total volume of the porous absorbent particles 630 is below 7% of the volume of the granule bed 610, a wicking capacity of the porous absorbent particles may be reduced, thereby reducing the cell charging and discharging efficiency and the cell capacity. When the total volume of the porous absorbent particles 630 is above 13%, the volume of the granule bed may be reduced, thereby reducing the cell capacity.

A distribution of the porous absorbent particles 630 in the granule bed 610 may be approximately uniform in order to maintain a more uniform distribution of liquid electrolyte in the granule bed during cell charging and discharging. As an example, the porous absorbent particles 630 may be positioned in the cathode compartment 600 while the cathode granules of the granule bed 610 are loaded into the cathode compartment 600. In one example, porous absorbent particles 630 may be positioned in the cathode compartment 600 at or near the walls of the separator 130 so that liquid electrolyte may be distributed more uniformly at or near the walls of the separator 130. In another example, the porous absorbent particles 630 may be mechanically mixed with the cathode granules.

Figure 6B:
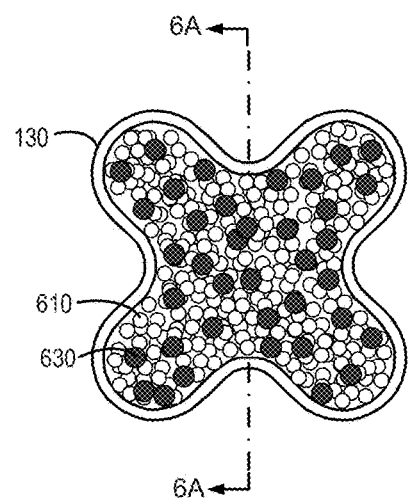
FIG. 6B is a schematic showing a transverse cross-sectional view of the granule bed in FIG. 6A at section 6B-6B.
Figure 6C:
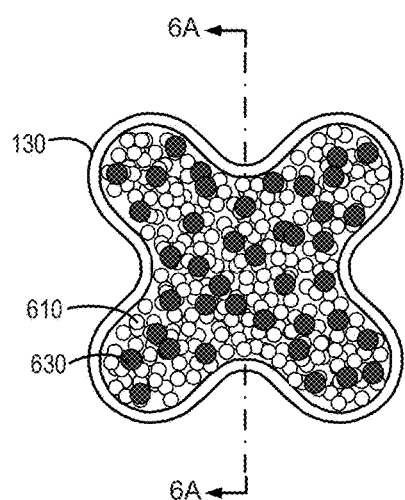
FIG. 6C is a schematic showing a transverse cross-sectional view of the granule bed in FIG. 6A taken at section 6C-6C.

Turning now to FIGS. 6B and 6C, they illustrate transverse cross-sections of the cathode compartment 600 taken at sections 6B-6B and 6C-6C, respectively, at two different longitudinal positions of the cathode compartment 600. FIGS. 6B and 6C show that the transverse cross-sectional distribution of the porous absorbent particles 630 in the granule bed 610 may vary in a longitudinal direction. The porous absorbent particles 630 may also be dispersed near the walls of the separator 130 and throughout the interior of the granule bed 610.

Figure 7A:
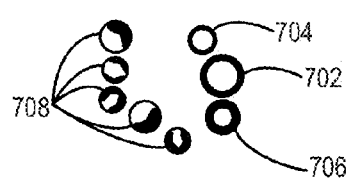
FIG. 7A is a schematic showing cross-sections of coated granules.

Turning now to FIG. 7A, it illustrates another embodiment of a porous absorbent comprising a porous absorbent coating on a surface of the metal granules, the coated metal halide granules, the coated sodium halide granules, or a suitable combination thereof. As illustrated in FIG. 7A, the coated granules may comprise larger coated granules (e.g., 702), and smaller coated granules (e.g. 704, 706). Furthermore, a thickness of the porous absorbent coating may be thicker (e.g., 706), and thinner (e.g., 704). Further still, the porous absorbent coating may partially coat the surface of the metal granules, the metal halide granules, the sodium halide granules, or a suitable combination thereof as shown in coated granules 708.

Figure 7C:
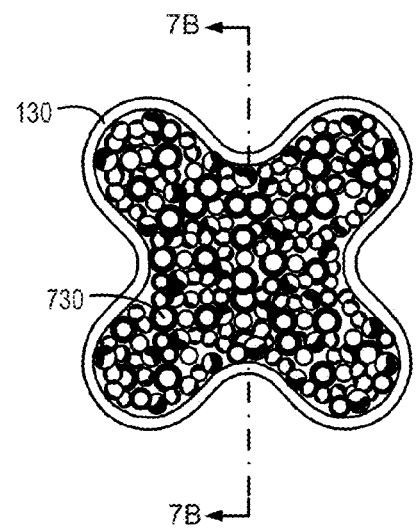
FIG. 7C is a schematic showing a transverse cross-sectional view of the cell in FIG. 7B taken at section 7C-7C.
Figure 7B:
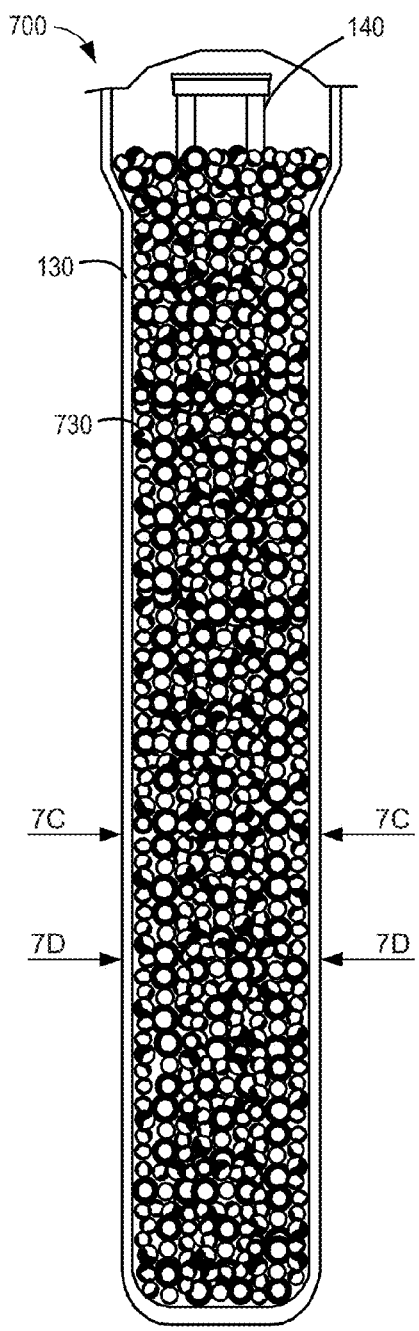
FIG. 7B is a schematic showing a longitudinal cross-sectional view of the cell in FIGS. 7C and 7D taken at section 7B-7B.

Turning now to FIG. 7B, it illustrates a partial longitudinal cross-section of a cathode compartment 700 comprising a granule bed including porous absorbent coated granules 730. The porous absorbent coated granules 730 may include metal granules, metal halide granules, and sodium halide granules coated with a porous absorbent coating. Providing a porous absorbent comprising a porous absorbent coating on a surface of the metal granules, the coated metal halide granules, the coated sodium halide granules, or a suitable combination thereof may increase the efficiency of cell charging and discharging because the liquid electrolyte can be distributed immediately adjacent to the surfaces of the metal granules, metal halide granules, and the sodium halide granules. For example, conduction of sodium ions through the granule bed to and from the separator 130 may be increased.

A thickness of the porous absorbent coating may be 200 µm or less. When the thickness of the porous absorbent coating is greater than 200 µm, the porous absorbent coating may reduce a conductivity of electrons through the granule bed and may thereby reduce the cell charging and discharging efficiency. The granule bed may further comprise a mixture of coated, including partially coated, and uncoated metal granules, metal halide granules, and/or sodium halide granules. A total volume of the porous absorbent coating of porous absorbent coated granules may be 1% or less a volume of the granule bed. When the total volume of the porous absorbent coating of porous absorbent coated granule is greater than 1% of the volume of the granule bed, conductivity of electrons and ions through the granule bed to and from the separator 130 may be reduced, thereby decreasing a cell charging and discharging efficiency.

Figure 7D:
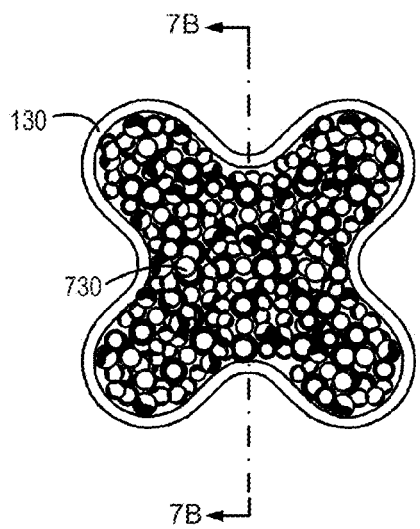
FIG. 7D is a schematic showing a transverse cross-sectional view of the cell in FIG. 7B taken at section 7D-7D

Turning now to FIGS. 7C and 7D, they illustrate transverse cross-sections of the cathode compartment 700 taken at sections 7C-7C and 7D-7D, respectively, at two different longitudinal positions of the cathode compartment 700. The porous absorbent coated granules 730 may also be dispersed near the walls of the separator 130 and throughout the interior of the granule bed. FIGS. 7C and 7D illustrate that the transverse cross-sectional distribution of the porous absorbent coated granules 730 in the granule bed of the cathode compartment 700 may vary in a longitudinal direction. For example the total volume of porous absorbent in the porous absorbent coated granules 730 at 7C-7C may be different than the total volume of porous absorbent in the porous absorbent coated granules 730 at 7D-7D.

Figure 8:
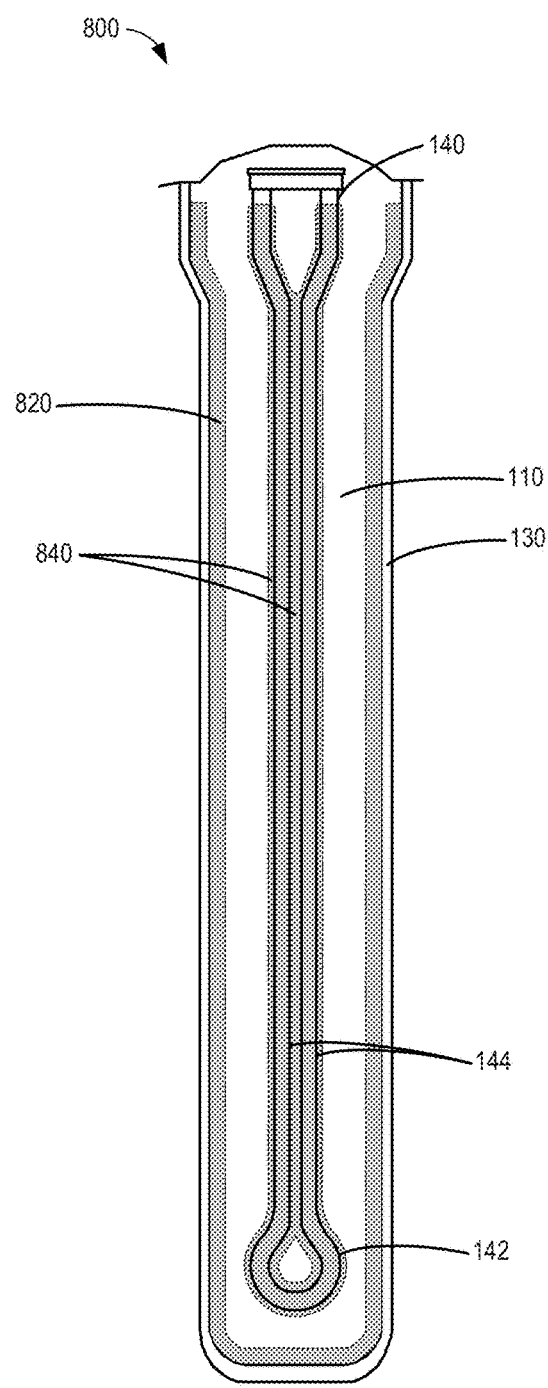
FIG. 8 is a schematic showing partial a longitudinal cross-sectional view of a sodium metal halide cell with porous absorbent-coated surfaces.

Turning now to FIG. 8, it illustrates another embodiment of a porous absorbent provided in a cathode compartment 800, wherein the porous absorbent comprises a porous absorbent coating on a surface adjacent to the granule bed. The surface adjacent to the granule bed may comprise one of a surface with face-sharing contact with the granule bed, a surface in contact with the granules, a surface embedded or immersed in the granule bed, or any suitable combination thereof. As examples, the surface adjacent to the granule bed may comprise a surface of the cathode current collector 140, including a portion of the cathode current collector 140, such as the tip 142 of the cathode current collector, the legs 144 of the cathode current collector 140, including portions thereof, or combinations thereof. As further examples, the surface adjacent to the granule bed may comprise a surface of the separator 130 in the cathode compartment 110, including a portion of the surface of the separator 130 making face-sharing contact with the granule bed, such as the longitudinal walls of the separator surrounding the granule bed, or the bottom of the separator contacting the bottom of the granule bed, or portions thereof, or combinations thereof. Further specific examples of the surface adjacent to the granule bed are described herein.

As an example, the porous absorbent may comprise a porous absorbent coating 820 on the walls of the separator 130. As another example, the porous absorbent may comprise a porous absorbent coating 840 on the surface of the cathode current collector 140.

As shown in FIG. 8, the porous absorbent coatings 820, 840 may span the length of the separator 130 and the cathode current collector 140, thereby providing liquid electrolyte conduit paths for more uniform wicking and distribution of liquid electrolyte along the entire length of the granule bed during cell charging and discharging. However, the dashed lines in FIG. 8 indicate that the porous absorbent coatings 820 and 840 may not be contiguous coatings. For example, portions of the cathode current collector 140 and/or the separator 130 may be coated with the porous absorbent coating, while other portions of the cathode current collector 140 and/or the separator 130 may not be coated with the porous absorbent coating.

In one embodiment, for example, the porous absorbent coating 820 may substantially coat a surface of the separator 130, wherein the porous absorbent coating coats at least a threshold surface area of the separator 130 in the cathode compartment 110. As an example, the threshold surface area may be 70% of the total surface of the separator 130 in the cathode compartment 110. The threshold surface area may also be from 60% to 80% of the total surface of the separator 130 and the coated surface area may be approximately uniformly distributed over the surface of the separator 130 in the cathode compartment 110. If the coated surface area is less than the threshold surface area, the wicking capacity of the porous absorbent coating 820 and the cell charging and discharging efficiency may be reduced. Furthermore if the porous absorbent coating 820 is not approximately uniformly distributed over the surface of the separator 130 in the cathode compartment 110, portions of the granule bed may not be saturated with liquid electrolyte during cell charging and discharging, and cell capacity may be reduced.

In another embodiment, for example, the porous absorbent coating 840 may substantially coat a surface of the cathode current collector 140, wherein the porous absorbent coating 840 coats at least a threshold surface area of the cathode current collector 140. As an example, the threshold surface area may be 70% of the total surface of the cathode current collector 140. The threshold surface area may also be from 60% to 80% of the total surface of the cathode current collector 140 and the coated surface area may be approximately uniformly distributed over the surface of the cathode current collector 140. If the coated surface area is less than the threshold surface area, the wicking capacity of the porous absorbent coating 840 and the cell charging and discharging efficiency may be reduced. Furthermore if the porous absorbent coating 840 is not approximately uniformly distributed over the surface of the cathode current collector 140, portions of the granule bed may not be saturated with liquid electrolyte during cell charging and discharging, and cell capacity may be reduced.

As such, at a first position, a surface of the separator and/or a surface of the cathode current collector may not be coated with a porous absorbent coating, wherein the granule bed may be adjacent to the surface of the separator and/or the surface of the cathode current collector. Furthermore, at a second position, a surface of the separator and/or a surface of the cathode current collector may be coated with a porous absorbent coating, wherein the granule bed may be adjacent to the porous absorbent coating on the surface of the separator and/or the porous absorbent coating on the surface of the cathode current collector.

In an embodiment, at a first longitudinal position, the granule bed contacts the surface of the separator, and at a second longitudinal position, the porous absorbent coating coats the surface of the separator and the granule bed contacts the porous absorbent coating. For example, in another embodiment, at the first longitudinal position, the granule bed directly contacts the surface of the separator, and at the second longitudinal position, the porous absorbent coating coats the surface of the separator and the granule bed contacts the porous absorbent coating but does not directly contact the surface of the separator.

In some examples, the walls of the separator 130 at the top end 108 of the cathode compartment 800 may not be coated with the porous absorbent coating 820 above a longitudinal position corresponding to an upper terminal position of the shim 126 in the anode compartment. Leaving a portion of the surface of the cathode current collector 140 and/or the separator 130 uncoated decreases the volume percent of the porous absorbent in the granule bed, increases the volume of the granule bed, and may increase the cell capacity.

A thickness of the porous absorbent coating 820 and/or 840 may be 200 or less. When the thickness of the porous absorbent coating 820 and/or 840 is greater than 200 µm, the porous absorbent coating may reduce a conductivity of ions to and from the separator 130, and may thereby reduce the cell charging and discharging efficiency. Furthermore, when the thickness of the porous absorbent coating 820 and/or 840 is greater than 200 µm, the volume of the granule bed may be reduced, thereby decreasing the cell capacity. A total volume of the porous absorbent coating 820 and/or 840 may be 0.5% or less a volume of the granule bed. When the total volume of the porous absorbent coating 820 and/or 840 is greater than 0.5% of the volume of the granule bed, the volume of the granule bed may be reduced, thereby decreasing the cell capacity.

In this manner, a cell cathode compartment comprises a granule bed comprising metal granules, metal halide granules, and sodium halide granules, a liquid electrolyte dispersed in the granule bed, a separator adjacent to the granule bed, and a porous absorbent disposed in the granule bed, wherein a transverse cross-sectional distribution of the porous absorbent in the granule bed varies in a longitudinal direction from a first position to a second position. The porous absorbent may comprise a slab having at least one patterned unit, wherein the patterned unit has one or more cutouts transversely recessed towards a longitudinal axis of the slab, and the at least one patterned unit may comprise a plurality of repeating patterned units. A total length of the one or more cutouts may be 30% or less of a patterned unit length, and a porosity of the porous absorbent may be from 90% to 95%. A volume percent of the porous absorbent may be from 4% to 9% of a volume of the granule bed.

In another example, the porous absorbent may comprise porous absorbent particles dispersed in the granule bed, wherein each of the porous absorbent particles has a diameter from 0.01 mm to 0.3 mm. A total volume percent of the porous absorbent particles may be from 7% to 13% of the granule bed.

In another example, the porous absorbent may comprise a porous absorbent coating on at least one of a surface of the metal granules, a surface of the metal halide granules, or a surface of the sodium halide granules. A total volume percent of the porous absorbent coating may be 1% or less of the granule bed.

Accordingly, a cell may comprise a cell cathode compartment including a granule bed comprising metal granules, metal halide granules, and sodium halide granules, a liquid electrolyte dispersed in the granule bed, and a porous absorbent disposed in the granule bed, wherein a transverse cross-sectional distribution of the porous absorbent in the granule bed varies in a longitudinal direction from a first position to a second position. The cell cathode compartment may further comprise a separator, wherein the separator comprises an electrically insulative sodium ion conductor. Furthermore, the cell cathode compartment may comprise a cathode current collector, a cell anode compartment comprising liquid sodium and an anode current collector, and a cell case housing the cathode compartment and the cell anode compartment. The separator may be positioned between the cell cathode compartment and the cell anode compartment. During cell charge, sodium ions migrate from the cell cathode compartment to the cell anode compartment through the separator, electrons flow from the cathode current collector to the anode current collector, and the liquid electrolyte flows from the porous absorbent to the granule bed. During cell discharge, sodium ions migrate from the cell anode compartment to the cell cathode compartment through the separator, electrons flow from the anode current collector to the cathode current collector, and the liquid electrolyte flows from the granule bed to the porous absorbent.

In this manner, a cell may comprise a granule bed in a cathode compartment, the granule bed comprising metal granules, metal halide granules, and sodium halide granules, a liquid electrolyte dispersed in the granule bed, a separator adjacent to the granule bed, and a porous absorbent disposed in the granule bed, the porous absorbent having a variable cross-sectional distribution in the granule bed. The porous absorbent may comprise a slab having dentate lengthwise edges. In another example, the porous absorbent comprises absorbent particles dispersed in the granule bed. In another example, the porous absorbent comprises an absorbent coating on at least one of a surface of the metal granules, a surface of the metal halide granules, or a surface of the sodium halide granules.

In another embodiment, a cell cathode compartment may comprise a granule bed comprising metal granules, metal halide granules, and sodium halide granules, a separator adjacent to the granule bed, a current collector disposed in the granule bed, and a porous absorbent coating on a surface adjacent to the granule bed. In one example, the porous absorbent coating on the surface adjacent to the granule bed may comprise a porous absorbent coating on a surface of the separator. The porous absorbent coating may substantially coat the surface of the separator, wherein at a first longitudinal position, the granule bed contacts the surface of the separator, and at a second longitudinal position, the porous absorbent coating coats the surface of the separator and the granule bed contacts the porous absorbent coating.

In another example, the porous absorbent coating comprises a porous absorbent coating on the surface of the cathode current collector. The porous absorbent coating may substantially coat the surface of the cathode current collector, wherein at a first longitudinal position, the granule bed contacts the surface of the cathode current collector, and at a second longitudinal position, the porous absorbent coating coats the surface of the cathode current collector and the granule bed contacts the porous absorbent coating. Furthermore, a total volume of the porous absorbent coating may be 0.5% of a granule bed volume or less, and a thickness of the porous absorbent coating may be 200 microns or less. Further still a porosity of the porous absorbent coating may be from 90% to 95%. Further still, the porous absorbent coating may comprise a carbonaceous non-woven material, graphitized polyacrylonitrile, or carbonized polyacrylonitrile.

In another example, a sodium metal halide cell may comprise a cathode compartment including, a granule bed comprising metal granules, metal halide granules, and sodium halide granules, a cathode current collector, a liquid electrolyte dispersed in the granule bed, a separator adjacent to the granule bed, and a porous absorbent coating on a surface adjacent to the granule bed. The sodium metal halide cell may further comprise an anode compartment, wherein the separator comprises an electrically insulative and ionically conductive material separating the anode compartment from the cathode compartment. The porous absorbent coating may comprise a discontiguous coating that substantially coats a surface of the separator, wherein the porous absorbent coating coats the surface of the separator below a longitudinal position corresponding to a metal shim height in the anode compartment. Further still, the sodium metal halide cell may further comprise a cathode current collector, wherein the porous absorbent coating comprises a discontiguous coating that substantially coats a surface of the cathode current collector.

Figure 9:
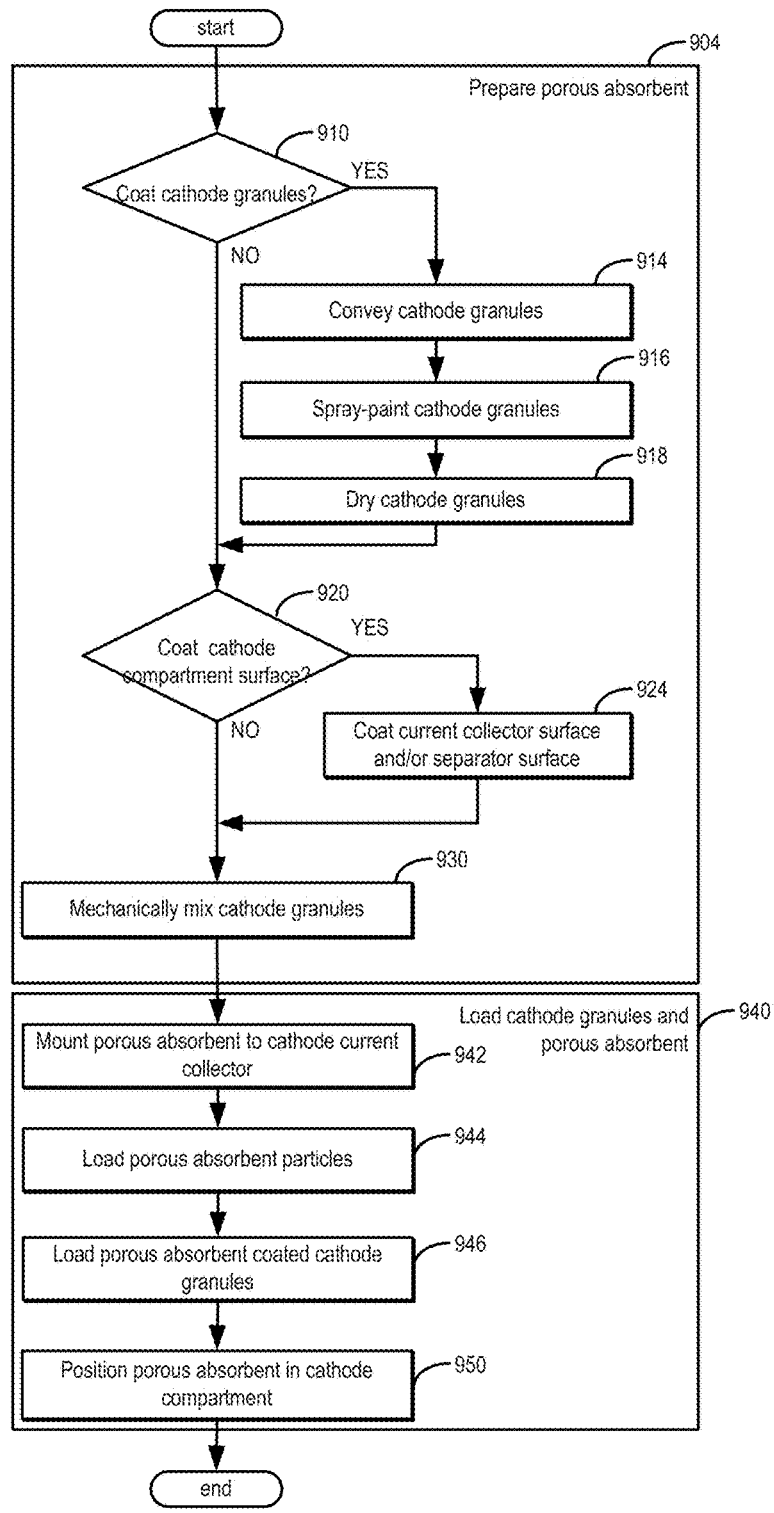
FIG. 9 is a schematic showing a flowchart of a method of preparing a cell cathode compartment.

Turning now to FIG. 9, it illustrates a flow chart for a method 900 of preparing a cell cathode compartment. Method 900 begins by preparing a porous absorbent at 904. Preparing a porous absorbent may comprise preparing porous absorbent coated granules. At 910, method 900 determines if cathode granules may be coated. The cathode granules may comprise the metal granules, the metal halide granules, and the sodium halide granules. The granules may be coated for producing porous absorbent coated granules 730. As one example, porous absorbent coated granules may be utilized to achieve close contact between the porous absorbent and the granules in order to increase ion conduction rates through the granule bed. Porous absorbent coated granules may also provide increased distribution of liquid electrolyte in the granule bed during cell charging and discharging, as compared to a monolithic porous absorbent structure. If the granules are coated, method 900 continues at 914 where the cathode granules are conveyed, for example, in a vibratory feeder. While conveying the cathode granules, at 916, the cathode granules may be spray-painted to coat the cathode granules with a porous absorbent coating. A vibratory feeder may be utilized for conveying the cathode granules during the spray-painting to more uniformly expose different granule surfaces for spray-painting, to achieve a more uniform porous absorbent coating on the surfaces of the granules. Alternate types of known conveying methods may also be utilized, such as using air or an inert gas to fluidize and convey the cathode granules. Next, at 918, method 900 may dry the cathode granules. Drying the cathode granules may comprise heating the spray-painted granules and or convecting heated air or inert gas through the granules. Drying the cathode granules may aid in removing solvent, and/or driving a reaction that cures and/or fixes the coating on the surface of the granules. For example, the porous absorbent coating may initially comprise a solvent for dispersing and reducing a viscosity of the porous absorbent coating so that it may be spray-painted on to the granule surfaces to form a thin approximately uniform coating in an expedient manner. As another example, the porous absorbent coating may comprise thermally curable chemical binders for chemically binding the porous absorbent coating to the granule surfaces. As such, drying the cathode granules may further comprise volatilizing the solvent and/or curing the porous absorbent coating.

Preparing the porous absorbent 904 continues at 920 from 918, or from 910, if the cathode granules are not coated. Preparing the porous absorbent 904 may comprise preparing porous absorbent coated cathode compartment surfaces. In particular, cathode compartment surfaces that are adjacent to the granule bed may be coated with a porous absorbent coating. Thus, at 920, method 900 determines if a surface of the cathode compartment may be coated. For example, the porous absorbent may comprise a porous absorbent coating on surface of the cathode current collector 140. Coating a surface of the cathode current collector 140 with a porous absorbent coating may increase current conduction to and from the granule bed to the cathode current collector 140 and increase cell efficiency during cell charging and discharging. As another example, the porous absorbent may comprise a porous absorbent coating on a surface of the separator 130. Coating the walls of the separator 130 in the cathode compartment 110 may increase ion conduction from the granule bed to and from the separator 130 during cell charging and discharging, thereby improving cell efficiency. If a surface of the current collector is to be coated, method 900 continues at 924 where the surfaces of the current collector and/or separator are coated. At 924, the resultant porous absorbent coating on a surface of the separator 130 and/or a surface of the cathode current collector 140 may be discontiguous. For example, at a first position, a surface of the separator 130 and/or a surface of the cathode current collector 140 may not be coated with a porous absorbent coating, wherein the granule bed may be adjacent to the surface of the separator 130 and/or the surface of the cathode current collector 140. Furthermore at a second position, a surface of the separator 130 and/or a surface of the cathode current collector 140 may be coated with a porous absorbent coating, wherein the granule bed may be adjacent to the porous absorbent coating on the surface of the separator 130 and/or the surface of the cathode current collector 140.

Method 900 continues at 930 from 924, or from 920 if the cathode compartment surfaces are not coated. Preparing the porous absorbent may also comprise mechanically mixing the cathode granules at 930. Mechanically mixing the cathode granules may comprise one or a suitable combination of known methods of mechanically mixing solid particles, or powder blending. For example, mechanically mixing the cathode granules may comprise fluidizing and mixing the cathode granules. Other processes may be used to prepare the porous absorbent.

Next, method 900 continues by loading the cathode granules and the porous absorbent into the cathode compartment at 940. Loading the cathode granules and the porous absorbent may comprise mounting a porous absorbent slab to the cathode current collector at 942. For example, the porous absorbent may be mounted between the legs of the current collector or at a side of the current collector as shown in FIGS. 4B and 4E, respectively. At 944, loading the cathode granule and the porous absorbent may comprise loading porous absorbent particles and dispersing the porous absorbent particles in the granule bed. As an example, the porous absorbent particles may be loaded into the cell cathode compartment while the cathode granules are loaded into the cell cathode compartment, thereby dispersing the porous absorbent particles in the granule bed. As another example, the porous absorbent particles may be mechanically mixed with the cathode granules, and then the mixed porous absorbent particles and cathode granules may be loaded into the cell cathode compartment. At 946, loading the cathode granules and porous absorbent may comprise loading porous absorbent coated cathode granules into the cell cathode compartment.

At 940, the cathode granules and the porous absorbent are loaded into the cell cathode compartment, wherein the porous absorbent is positioned to have a non-uniform cross-sectional distribution in the cell cathode compartment at 950. For example, the porous absorbent slab may comprise a patterned unit, the patterned unit having one or more cutouts transversely recessed towards a longitudinal axis of the slab. As such, when the porous absorbent slab is mounted to the cathode current collector, the porous absorbent slab is positioned to have a non-uniform cross-sectional distribution in the cell cathode compartment. As another example, positioning the porous absorbent may comprise feeding porous absorbent particles into the cathode compartment as the cathode granules are loaded into the cathode compartment to disperse the porous absorbent particles in the granule bed. The distribution of dispersed porous absorbent particles in the granule bed may not be uniform. Furthermore, the size distribution of the porous absorbent particles in a granule cross-section may vary across a length of the granule bed. As such, the porous absorbent particles are positioned in the granule bed, wherein the porous absorbent is positioned to have a non-uniform cross sectional distribution in the cell cathode compartment.

Further still, positioning the porous absorbent in the cathode compartment may comprise loading porous absorbent coated granules into the cathode compartment. The thicknesses and coating volume of the porous absorbent coating on the porous absorbent coated granules is not uniform across all cathode granules. As such, the porous absorbent coated granules are positioned in the granule bed, wherein the porous absorbent is positioned to have a non-uniform cross sectional distribution in the cell cathode compartment. For example, the porous absorbent coated granules may not be contiguously coated, and some cathode granules may not be coated at all. Other methods of loading the cathode granules and porous absorbent may be utilized.

In this manner a method of preparing a cell cathode compartment may comprise preparing a porous absorbent, and loading the cathode granules and the porous absorbent into the cell cathode compartment, wherein the porous absorbent is positioned to have a non-uniform cross-sectional distribution in the cell cathode compartment. Loading the porous absorbent may comprise mounting a porous absorbent slab to a cathode current collector, the porous absorbent slab comprising one or more cutouts transversely recessed towards a longitudinal axis of the slab. Furthermore, loading the porous absorbent may comprise loading porous absorbent particles dispersed in the granule bed. Preparing a porous absorbent may comprise coating the cathode granules with a porous absorbent coating, wherein loading the porous absorbent comprises loading the porous absorbent coated cathode granules into the cathode compartment.

In another example, a method of preparing a cell cathode compartment may comprise applying a porous absorbent coating to a cell cathode compartment surface, mechanically mixing cathode granules, and loading the cathode granules into the cell cathode compartment to form a granule bed, wherein a portion of the porous absorbent coating is adjacent to the granule bed. Applying the porous absorbent coating to the cell cathode compartment surface may comprise applying the porous absorbent coating to a cathode current collector surface and/or a separator surface, and the porous absorbent coating may have a variable cross-sectional distribution. Furthermore, the porous absorbent coating may comprise a carbonaceous non-woven material.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A cell cathode compartment, comprising:
a granule bed comprising metal granules, metal halide granules, and sodium halide granules;
a separator adjacent to the granule bed;
a cathode current collector disposed in the granule bed; and
a porous absorbent coating;
wherein the porous absorbent coating substantially coats a surface of the cathode current collector and a surface of the separator that is adjacent to the granule bed, wherein
at a first longitudinal position, the granule bed contacts the surface of the separator, and
at a second longitudinal position, the porous absorbent coating coats the surface of the separator and the granule bed contacts the porous absorbent coating.

2. The cell cathode compartment of claim 1, wherein a total volume of the porous absorbent coating is 0.5% of a granule bed volume or less.

3. The cell cathode compartment of claim 1, wherein a thickness of the porous absorbent coating is 200 microns or less.

4. The cell cathode compartment of claim 1, wherein a porosity of the porous absorbent coating is from 90% to 95%.

5. The cell cathode compartment of claim 1, wherein the porous absorbent coating comprises a carbonaceous non-woven material.

6. A cell, comprising:
the cell cathode compartment of claim 1,
a cell anode compartment comprising liquid sodium and an anode current collector; and
a cell case housing the cell cathode compartment and the cell anode compartment, wherein
the separator is positioned between the cell cathode compartment and the cell anode compartment;
during cell charge, sodium ions migrate from the cell cathode compartment to the cell anode compartment through the separator, electrons flow from the cathode current collector to the anode current collector, and the liquid electrolyte flows from the porous absorbent to the granule bed; and
during cell discharge, sodium ions migrate from the cell anode compartment to the cell cathode compartment through the separator, electrons flow from the anode current collector to the cathode current collector, and the liquid electrolyte flows from the granule bed to the porous absorbent.

7. A method of preparing a cell cathode compartment, comprising:
mechanically mixing cathode granules;
loading the cathode granules into a cell cathode compartment to form a granule bed comprising metal granules, metal halide granules, and sodium halide granules;
applying a porous absorbent coating to a surface of a cathode current collector of the cell cathode compartment such that the porous absorbent coating substantially coats the surface of the cathode current collector;
applying the porous absorbent coating to a surface of a separator of the cell cathode compartment such that the porous absorbent coating substantially coats the surface of the separator, the separator disposed adjacent to the granule bed,
wherein the surface of the separator is adjacent to the granule bed,
wherein the cathode current collector is disposed in the granule bed, and wherein
at a first longitudinal position, the granule bed contacts the surface of the separator; and
at a second longitudinal position, the porous absorbent coating coats the surface of the separator and the granule bed contacts the porous absorbent coating.

8. The method of claim 7, wherein the porous absorbent coating has a variable cross-sectional distribution.

9. The method of claim 7, wherein the porous absorbent coating comprises a carbonaceous non-woven material.

10. A sodium metal halide cell, comprising:
a cell cathode compartment including:
a granule bed comprising metal granules, metal halide granules, and sodium halide granules;
a cathode current collector disposed in the granule bed;
a liquid electrolyte dispersed in the granule bed;
a separator adjacent to the granule bed; and
a porous absorbent coating;
wherein the porous absorbent coating substantially coats a surface of the cathode current collector and a surface of the separator that is adjacent to the granule bed, wherein
at a first longitudinal position, the granule bed contacts the surface of the separator, and
at a second longitudinal position, the porous absorbent coating coats the surface of the separator and the granule bed contacts the porous absorbent coating.

11. The sodium metal halide cell of claim 10, further comprising an anode compartment, wherein the separator comprises an electrically insulative and ionically conductive material separating the anode compartment from the cathode compartment.

12. The sodium metal halide cell of claim 11, wherein the porous absorbent coating comprises a discontiguous coating that substantially coats the surface of the separator.

13. The sodium metal halide cell of claim 12, wherein the porous absorbent coating coats the surface of the separator below a longitudinal position corresponding to a metal shim height in the anode compartment.

14. The sodium metal halide cell of claim 10, wherein the porous absorbent coating comprises a discontiguous coating that substantially coats the surface of the cathode current collector.

15. The cell cathode compartment of claim 1, wherein at the first longitudinal position, the granule bed contacts the surface of the cathode current collector.

16. The cell cathode compartment of claim 15, wherein at the second longitudinal position, the porous absorbent coating coats the surface of the cathode current collector.

* * * * *